United States Patent

[11] 3,625,979

[72] Inventor: Werner Heimberger, Hanau am Main, Germany
[21] Appl. No. 685,258
[22] Filed: Nov. 24, 1967
[45] Patented: Dec. 7, 1971
[73] Assignee: Deutsche Gold-und Silber-Scheidean-Stalt vormals Roessler, Frankfurt am Main, Germany
[32] Priority: Nov. 24, 1966
[33] Germany
[31] D 51628

The portion of the term of the patent subsequent to May 25, 1988, has been disclaimed.

[54] NOVEL BIOLOGICALLY ACTIVE SUBSTITUTED-S-TRIAZINES
5 Claims, No Drawings

[52] U.S. Cl.................................260/247.5R, 260/247.2 B, 260/249.6, 260/240 G, 424/248, 424/249
[51] Int. Cl............................................ C07d 55/22
[50] Field of Search............................. 260/240 G, 249.6, 247.5, 247.2

[56] References Cited
UNITED STATES PATENTS
3,178,423  4/1965  Staehelin et al. .............. 260/240
3,310,557  3/1967  Kleemann .................... 260/249.6

Primary Examiner—John M. Ford
Attorney—Stephens, Huettig & O'Connell

ABSTRACT: Novel biologically active substituted-s-triazines having anti-inflammatory action of the formula

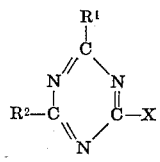

as well as their pharmologically acceptable acid addition salts with organic and inorganic acids wherein X is an N-cycloalkyl-di-imine radical, preferably, a piperazine or homopiperazine radical or their N'-alkyl, N'-alkylol or N'-acyl substitution products in which the alkyl or alkylol groups contain one to six carbon atoms and the acyl radicals are

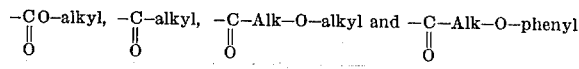

wherein the Alk is alkylene and the alkyl and alkylene have up to six carbon atoms, $R^1$ is one of the radicals

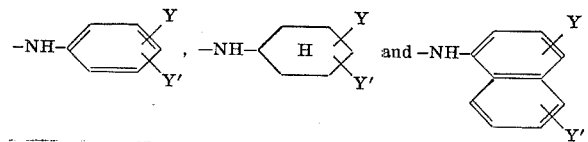

wherein each Y and Y' is hydrogen, halogen, $-NO_2$, —alkyl, —O—alkyl, —OH or COOH, wherein the alkyl has up to six carbon atoms and $R^2$ is

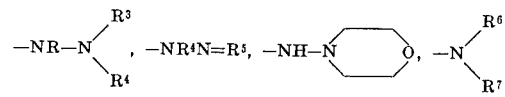

morpholino, piperazino, homopiperazino, piperidino or pyrrolidino, wherein each of R, $R^3$ and $R^4$ is hydrogen or an alkyl group of one to six carbon atoms or an aryl group, $R^5$ is lower alkyl, cycloalkyl, alkyl aryl, each of $R^6$ and $R^7$ is hydrogen, alkyl of one to six carbon atoms, morpholino alkyl, piperazino alkyl, homopiperazino alkyl, hydroxy alkyl, alkylene diamine whose second nitrogen atom may be substituted by alkyl or phenyl, the alkyl and alkylene included in $R^1$–$R^7$ having from one to six carbon atoms and the aryl preferably being phenyl.

NOVEL BIOLOGICALLY ACTIVE SUBSTITUTED-S-TRIAZINES

BACKGROUND OF THE INVENTION

The invention concerns Novel substituted -s-triazine compounds having antiinflammatory activity.

It is known that compounds of the formula

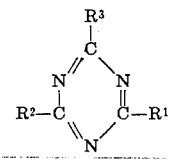

and their salts, wherein $R^1$ and $R^2$ are lower hydrocarbon radicals of aliphatic character, the aliphatic chain of which may be interrupted by heteroatoms, such as oxygen, nitrogen or sulfur, or disubstituted amino groups and $R^3$ is hydroazino substituted with at least one substituted or unsubstituted hydrocarbon radical of aliphatic character, the aliphatic chain of which may be interrupted, are marked by their special blocking action (German Published application 1,163,840).

DESCRIPTION OF THE INVENTION Including Preferred Embodiments

The present invention concerns novel compounds of the formula I described above, as well as their pharmacologically acceptable acid addition salts.

These compounds can be prepared by:

a. first reacting a tris-halogen-s-triazine, preferably tris-chloro-s-triazine with a compound of the formula

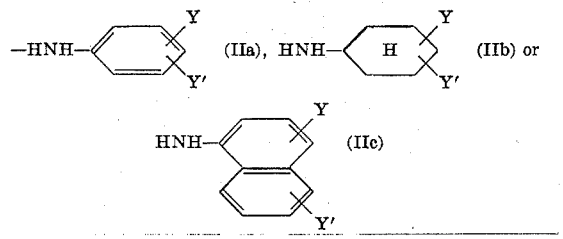

in a known manner to produce a compound of the formula

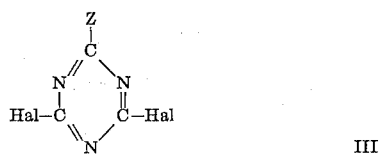

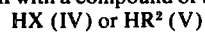

wherein Hal is halogen and Z is a radical of one of the compounds of the formulas IIa, IIb and IIc and reacting such compound of formula III with a compound of the formula HX (IV) or HR² (V)

(piperazine and homopiperazine being excluded if only monopiperazino or monohomopiperazino compounds are to be prepared) to produce a compound of the formula

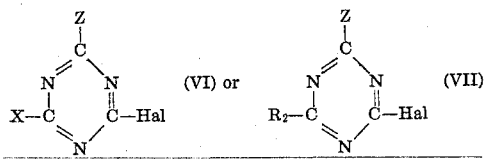

and then if desired reacting such compound with a piperazine or homopiperazine, b. reacting the tris-halogen-s-triazine first with a compound of formula IV or V and then with a compound of formula, IIa, IIb or IIc, preferably, without isolation and then if necessary thereafter with the piperazine or homopiperazine, c. reacting a compound of the formula VI or VII with the piperazine or homopiperazine (when only monopiperazino or homopiperazino are to be prepared, reacting a compound of the formula VI wherein piperazine and homopiperazine, are excluded from the definition of $R^2$ with the piperazine or homopiperazine), d. reacting a compound of the formula

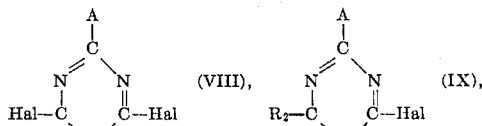

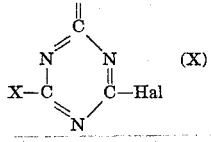

in which A is —SH, —SAlk, —OAlk or

according to one of the methods a., b. or c., whereby piperazine or homopiperazine may also be introduced in a second position and if desired acylating the compound containing a cycloalkyldi-imine radical with an acid chloride or acid ester and/or if desired converting the compounds to their salts.

The preparation of the compounds which involves conventional methods can, for instance, be carried out by dissolving the starting triazine containing one or more halogen atoms in an organic solvent, such as, acetone or methylene chloride and then adding at least an equimolecular quantity of the amine concerned. It is also possible, however, to operate in aqueous suspensions.

The reaction preferably is carried out in the presence of an acid binding agent. Depending upon the substituents concerned the reaction can be carried out at room temperature, or above or below room temperature.

All acids normally employed in the production of medicament salts can be used for the production of the salts of the compounds according to the invention, such as, for example, HCl HBr, $H_2SO_4$, maleic acid, fumaric acid molonic acid, acetic acid and the like.

The compounds according to the invention possess valuable pharmaceutical properties and are especially valuable because of their antiphlogistic and analgesic action upon oral, enteral and parenteral administration.

The compounds, for example, upon oral administration in doses of 1 to 300 mg./kg. exhibit a strong antiphlogistic action on ovablum edema of the rat paw. The compounds upon oral administration to rats act tonic in doses over 200 mg./kg. and in some instances 10,000 mg./kg.

In addition, the compounds upon oral administration in doses of 10 to 500 mg./kg. have a strong analgesic action. (Haffner-test, Dtsch. Med. Wschr. 55, 731 (1929)

The following examples will serve to illustrate the compounds according to the invention and their preparation.

The following examples will serve to illustrate the novel compounds according to the invention.

EXAMPLE 1

553.5 g. of cyanuric chloride (3 MOL) were dissolved in 2 liters of acetone and 261.5 g. of morpholine (3 mol) added dropwise over a period of 1 hour at 0° to −5° C. In order to complete the conversion of the morpholine a solution of 120 g. of NaOH (3 mol) in 400 ml. of water were added under the same conditions. The triazine compound which precipitated was filtered off and dissolved in 400 ml. of methylene chloride to separate it from the water. Such solution was then dried with anhydrous $Na_2SO_4$. After the methylene chloride was distilled off, 237 g. of 2-morpholino-4,6-bichloro-s-tirazine of a melting point of 130° C. (decomposition) were obtained. The yield was 33.5 percent of theory, the product was 97 percent pure. A further quantity could be recovered from the mother liquor.

23.5 g. of the product (one-tenth mol) were dissolved in 300 ml. of acetone and 9.31 g. of aniline (one-tenth mol) added dropwise thereto at room temperature over a 30 minute period. The reaction of the aniline was completed by addition of 4 g. of NaOH (1/;0 mol) in 50 ml. of $H_2O$ under the same conditions. The triazine compound with precipitated was filtered off, washed with water and dried. 22.6 g. of 2-morpholino-4-anilino-6-chloro-s-triazine of a melting point of 165°–170° C. were obtained. The yield was 77.4 percent of theory.

Sixty-nine grams of the compound (0.237 mol) were introduced into a boiling solution of 130 g. of piperazine hexahydrate (3×0.237 mol) in 40 ml. of ethanol and the mixture heated under reflux for 30 minutes. The solution was then concentrated under vacuum and the residue dissolved in 300 ml. of methylene chloride, washed with water, dried with $Na_2SO_4$ and concentrated. Crystallization was engendered in the residue by treatment with methylene chloride-hexane (3:7). 53.2 g. of 2-anilino-4-morpholino-6-piperazino-s-triazine with a melting point of 160°–163° C. were obtained. The yield was 65.6 percent of theory.

EXAMPLE 2

184.5 g. of cyanuric chloride (1 mol) were dissolved in 1,400 ml. of acetone and 186.26 g. of aniline (2 mol) added dropwise thereto while stirring at 0° to −5° C. over a period of 1 hour. The aniline hydrochloride which precipitated out was filtered off and the acetone solution concentrated under vacuum. The residue was washed with ice water and filtered off on a suction filter. The water remaining in the residue was removed by dissolving in methylene chloride as described in example 1. After the methylene chloride was distilled off, 197 g. of 2-anilino-4,6-bischloro-s-triazine (97 percent) of a melting point of 122°–125° C. were obtained. The yield was 81.7 percent of theory.

24.1 g. of this compound (one-tenth mol) were dissolved in 150 ml. of acetone and 8.91 g. of morpholine (one-tenth mol) added dropwise thereto while stirring at room temperature over a 30 minute period. The reaction was completed by addition of a solution of 4 g. of NaOH in 50 ml. of water under the same conditions. The triazine compound which precipitated out was filtered off, washed with water and dried. Twenty-four grams of 2-anilino-4-morpholino-6-chloro-s-triazine (98 percent) with a melting point of 192°–195° C. were obtained. This compound was reacted with piperazine hexahydrate to produce the 2-anilino-4-morpholino-6-piperazino-s-trazine as described in example 1.

EXAMPLE 3

Seventy-nine grams of 2-(2-chloro)-anilino-4-morpholino-6-chloro-s-triazine (0.242 mol) with a melting point of 156°–159° C. were reacted with piperazine hexahydrate as described in example 1. 63.2 g. of 2-(2-chloro)-anilino-4-morpholino-6-piperazino-s-traizine of a melting point of 145°–149° C. were obtained. The yield was 69.5 percent of theory.

EXAMPLE 4

46.1 g. of cyanuric chloride (0.25 mol) were dissolved in 600 ml. of acetone and 69 g. of 3-nitroaniline (0.5 mol) added portionwise thereto at room temperature while stirring. After stirring for a further 3 hours the 3-nitroaniline hydrochloride which precipitated out was filtered off and then 43.6 g. morpholine (0.5 mol) were added to the solution dropwise within a 30 minute period under the same conditions. The triazine compound precipitated out together with the morpholine hydrochloride. The triazine compound was recovered from the precipitate after removal of the solvent by washing with water. 63.5 g. of 2-(3-nitro)-anilino-4-morpholino-6-chloro-s-triazine (98 percent) with a melting point of 244°–249° C. were obtained. The yield was 75.4 percent of theory.

63.5 g. of the product thus produced (0.188 mol) were added portionwise while stirring to a boiling solution of 110 g. of piperazine hexahydrate (3×0.188 mol) in 600 ml. of ethanol over a 60 minute period and the mixture heated for a further 30 minutes. When the resulting solution was stored overnight at room temperature the byproducts (dimers) separate out and these were filtered off. The solution was concentrated and the residue washed with water and dried.

66.1 g. of 2-(3-nitro)-anilino-4-morpholino-6-piperazino-s-triazine (95 percent) with a melting point of 190°–173° C. were obtained. The yield was 90.8 percent of theory.

EXAMPLE 5

46.1 g. of cyanuric chloride (0.25 mol) were dissolved in 500 ml. of methylene chloride and 53.6 g. of o-toluidine (0.5 mol) added thereto dropwise while stirring at 0° to −5° C. over a 30 minute period. The toluidine hydrochloride which precipitated out was filtered off and 43.6 g. of morpholine (0.5 mol) added dropwise to the solution at room temperature during a 30 minute period. The morpholine hydrochloride which precipitated out was filtered off and the methylene chloride distilled off from the solution. The residue was washed with water and dried. 73.5 g. of 2-(2-methyl)-anilino-4-morpholino-6-chloro-s-triazine with a melting point of 146°–150° C. were obtained. The yield was 96.6 percent of theory. This compound was reacted with piperazine hexahydrate as described in example 4 to product 2-(2-methyl)-anilino-4-morpholino-6-piperazino-s-triazine with a melting point of 128°–131° C.

The procedure was repeated, however, using m- and p-toluidine in place of the o-toluidine in the first step whereby 2-(3-methyl)-anilino-4-morpholino-6-chloro-s-triazine of a melting point of 144°–146° C. and 2-(4-methyl)-anilino-4-morpholino-6-chloro-s-triazine of a melting point of 205°–207° C. were obtained. These compounds were reacted with piperazine hexahydrate again as described in example 4 to produce the corresponding 2-(3-methyl)-anilino-4-morpholino-6-piperazino-s-triazine of a melting point of 109° to 114° C. and 2-(4-methyl)-anilino-4-morpholino-6-piperazino-s-triazine of a melting point of 180°–190° C.

EXAMPLE 6 a. 46.1 g. of cyanuric chloride (0.25 mol) were dissolved in 600 ml. of acetone and a solution of 39.4 g. of 4-chloro-2-anisidine (0.25 mol) in 100 ml. of acetone added portionwise thereto while stirring at 10° C. over a 30 minute period. The reaction was completed by addition of a solution of 10 g. of NaOH (0.25 mol) in 60 ml. of water. Thereafter, 21.8 g. of morpholine (0.25 mol) were added dropwise at room temperature and the reaction again completed by addition of a further 10 g. of NaOH dissolved in 60 ml. of water. The triazine compound which precipitated out was filtered off, washed and dried. Eighty-one grams of 2-(2-methoxy-4-chloro)-anilino-4-morpholino-6-chloro-s-triazine (95 percent) with a melting point of 168°–170° C. were obtained. The yield was 91 percent of theory. This compound was reacted with piperazine hexahydrate as described in example 4 to produce 2-(2-methoxy-4-morpholino-6-piperzino-s-triazine of a melting point of 180°–182° C.

b. The procedure was repeated using 4-methoxy-aniline instead of the 4-chloro-2-anisidine. The resulting 2-(4-methoxy)-anilino-4-morpholino-6-chloro-s-triazine had a melting point of 146°–150° C. and the 2-(4-methoxy)-anilino-4morpholino-6-piperazino-s-triazine had a melting point of 205°–208° c.

EXAMPLE 7

46.1 g. of cyanuric chloride (0.25 mol) were dissolved in 600 ml. of acetone and a solution of 54.5 g. of p-aminophenol (0.5 mol) in 200 ml. of acetone added thereto portionwise at 10° C. while stirring over a period of 30 minutes. The hydrochloride of the p-aminophenol which precipitated out was filtered off and 43.6 g. of morpholine (0.5 mol) then added to the filtrate. The hydrochloride of the morpholine precipitated out together with the triazine compound as described in example 4. The processing was the same as in example 4. After washing and drying, 41.0 g. of 2-(4-hydroxy)-anilino-4-morpholino-6-chloro-s-triazine (98percent) with a melting point of 194°–197° C. were obtained. The yield was 59.1 percent of theory. This compound was reacted with piperazine hexahydrate as described in example 4 to product 2-(4-hydroxy)-anilino-4-morpholino-6-piperazino-s-triazine of a melting point of 208°–212° C.

EXAMPLE 8

67.3 g. of 2-cyclohexylamino-4-morpholino-6-chloro-s-triazine (0.235 mol) were reacted with piperazine hexahydrate as described in example 1. Fifty-three grams of 2-cyclohexylamino-4-morpholino-6-piperazino-s-triazine with a melting point of 132°–138° C. were obtained. The yield was 65.5 percent of theory.

EXAMPLE 9

The procedure of example 5 was repeated using α-naphthylamine instead of o-toluidine. The 2-(α)-naphthylamino-4-morpholino-6-chloro-s-tirazine produced had a melting point of 204°–208° C. and the 2-(α)-naphthylamino-4-morpholino-6-piperazino-s-triazine produced therefrom was a viscous oil.

EXAMPLE 10 a. 35.5 g. (0.1 mol) of 2-(3-methyl)-anilino-4-morpholino-6-piperazino-s-triazine prepared as in example 6 were dissolved in 300 ml. of methylene chloride at room temperature and 10.12 g. (0.1 mol) of triethyl amine and 11.29 g. (0.1 mol) of chloroacetyl chloride added thereto dropwise at the same time, whereupon the temperature of the solution rose to 30° C. After the reaction mixture had been permitted to stand for 1 hour the solvent was distilled off and the residue washed several times with water. 41.5 g. of 2-(3-methyl)-anilino-4-morpholino-6-N'(chloroacetyl)piperazino-s-triazine

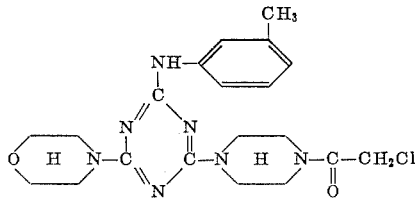

were obtained. Its melting point was 143°–45° C. and the yield 96.2 percent of theory.

b. 43.15 g. of the product thus produced were added portionwise to a solution of 2.53 g. (0.11 mol) of Na and 10.34 g. of phenol (0.11 mol) in 400 ml. of ethanol. After 2 hours' heating under reflux complete solution was effected. Upon cooling to room temperature NaCl precipitated out and this was filtered off. The ethanol was distilled off and the residue washed with water. 34.7 g. of 2-(3-methyl)anilino-4-morpholino-6-4-N'-phenoxyacetyl-piperazino-s-triazine with a melting point of 185°–88° C. were obtained. The yield was 71 percent of theory.

EXAMPLE 11

37.5 g. of 2-(2-chloro)-anilino-4-morpholino-6-piperazino-s-triazine produced according to example 3 were dissolved in 500 ml. of methylene chloride and then 11.13 g. (0.11 mol) added thereto. Subsequently, 11.93 g. (0.11 mol) of chloroformic acid ethyl ester were added dropwise while stirring at room temperature, whereupon the temperature of the solution rose to 35° C. After 1 hour's standing, the solution was washed twice with water, then dried and the solvent distilled off. The residue was washed with water and dried. 39.2 g. of 2-(2-chloro)-anilino-4-morpholino-6-N'-carboxyethyl-piperazino-s-triazine

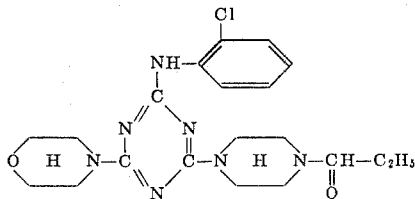

EXAMPLE 12 a. 46.1 g. (0.25 mol) of cyanuric chloride were suspended in a mixture of 600 ml. of acetone and 300 ml. of water and 26.8 g. of m-toluidine added thereto over a 30 minute period while stirring and cooling to 0° to −5° C. Thereafter a solution of 10 g. of NaOH in 50 ml. of $H_2O$ was added dropwise.

The reaction mixture is then heated to 25° C. (PH 7) and 21,25 g. (0.25 mol) piperidine are added. After this a solution of 10 g. (0.25 mol) NaOH in 50 ml. $H_2O$ is added dropwise in such a manner that the PH of 7 did not change. After filtration 70 g. of 2-(3-methyl)anilino-4-piperidino-6-chloro-s-triazine of a melting point of 67°–71° C. were obtained. The yield was 92.4 percent of theory.

Similarly, 70 g. of 2-(4-methyl)anilino-4-piperidino-6-chloro-s-triazine with a melting point of 128°–132° C. were obtained when the m-toluidine was replaced by p-toluidine b. 30.35 g. of each of the compounds obtained above were respectively added portionwise to a solution of 58.2 g. of piperazine hexahydrate in ethanol boiling under reflux over a period of 3 hours, whereupon solution occurred. The solution was then allowed to stand overnight to separate out the dimeric byproducts. After filtration the ethanol was distilled off and the residue washed with water until neutral and dried. The yield of the compounds produced was 30.5 g. or 86.4 percent of theory.

The 2-(3-methyl)anilino-4-piperidino-6-piperazino-s-triazine had a melting point of 135°–138° C. and the corresponding 2-(4-methyl)anilino compound had a melting point of 179°–181° C. The maleates were prepared by introducing the compounds into an equimolar solution of maleic acid in methanol. The melting points of the salt produced respectively were 158° C. with decomposition and 190° C. with decomposition.

EXAMPLE 12

The procedure of example 11 (a) was repeated except that m-anisidine was employed instead of the toluidines. Seventy-two grams of 2-(3-methoxy)-anilino-4-piperidino-chloro-s-triazine of a melting point of 117°–120° C. (90.2 percent of theory) were obtained. When 31.95 g. thereof were reacted with piperazine hexahydrate as in example 11 (b), 28.8 g. of 2-(3-methoxy)-anilino-4-piperidino-6-piperazino-s-triazine with a melting point of 153°–156° C. were obtained. The yield was 77.9 percent of theory.

EXAMPLE 13

29.8 g. (0.1 mol) of 2-cyclohexylamino-4-morpholino-6-chloro-s-triazine were suspended in 250 ml. of ethanol and 2.0 g. (0.1 mol) of N'methyl piperazine added thereto and the mixture heated under reflux for 1 hour, whereupon solution resulted. After the solvent was distilled off the residue was dissolved in methylene chloride and washed with water.

After the methylene chloride was distilled off, 29 g. of 2-(cyclohexylamino-4-morpholino-6-N'methyl-piperazino-s-triazine were obtained. The yield was 80.3 percent of theory.

The compound was immediately converted to the maleic acid salt as in example 12 (b). Thirty-five grams of the salt with a melting point of 203°–207° C. were obtained. The yield was 73.4 percent of theory.

I claim:

1. A triazine compound selected from the group consisting of compounds of the formula

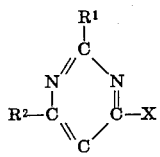
I wherein X is

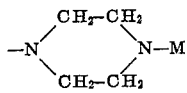

wherein M is selected from from the group consisting of hydrogen, alkyl, alkylol, $-\underset{\underset{O}{\|}}{C}-alkyl$, $-\underset{\underset{O}{\|}}{C}O-alkyl$, $-\underset{\underset{O}{\|}}{C}-Alk-O-alkyl$ and $-\underset{\underset{O}{\|}}{C}-Alk-O-phenyl$ Alk being alkylene, and the alkyl and alkylene included in M having up to six carbon atoms, $R^1$ is selected from the group consisting of

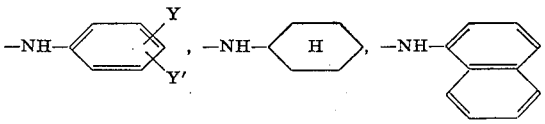

wherein each of Y and Y' are selected from the group consisting of hydrogen, chlorine, lower alkyl, lower alkoxy, $-NO_2$ and $-OH$ and $R^2$ is selected from the group consisting of morpholino and piperidino and their pharmacologically acceptable acid addition salts.

2. The compound according to claim 1, 2-(2-chloro)-anilino-4-morpholino-6-piperazino-s-triazine.

3. The compound according to claim 1, 2-(2-methyl)-anilino-4-morpholino-6-piperazino-s-triazine.

4. The compound according to claim 1, 2-(3-methyl)-anilino-4-morpholino-6-piperazino-s-triazine.

5. The compound according to claim 1, 2-(4-methyl)-anilino-4-morpholino-6-piperazino-s-triazine.

* * * * *